United States Patent [19]

Krug et al.

[11] 4,247,602

[45] Jan. 27, 1981

[54] SILVER ALLOY WIRE FOR JEWELRY CHAINS

[75] Inventors: Hans Krug, Pforzheim; Kurt Heilmann, Eisingen, both of Fed. Rep. of Germany

[73] Assignee: Ferd. Wagner, Pforzheim, Fed. Rep. of Germany

[21] Appl. No.: 48,588

[22] Filed: Jun. 13, 1979

[30] Foreign Application Priority Data

Jun. 19, 1978 [DE]  Fed. Rep. of Germany ....... 2826813

[51] Int. Cl.³ .................... B32B 15/02; B23K 35/28
[52] U.S. Cl. ............................. 428/671; 75/173 C;
428/673; 428/686; 428/925; 428/926; 428/941
[58] Field of Search ............... 428/671, 673, 656, 927, 428/686, 936, 925, 926, 941; 75/173 C

[56] References Cited

U.S. PATENT DOCUMENTS

| 978,847 | 12/1910 | Carlisle | 428/927 X |
|---|---|---|---|
| 1,109,423 | 9/1914 | Kammerer | 428/673 X |
| 1,465,553 | 8/1923 | Kirk | 428/927 X |
| 1,579,819 | 4/1926 | King | 428/927 X |
| 1,712,244 | 5/1929 | Bek et al. | 428/927 X |
| 1,779,809 | 11/1930 | Gray | 428/673 |
| 2,138,088 | 10/1938 | Capillon | 428/656 |
| 3,778,894 | 12/1973 | Kono et al. | 428/671 X |

FOREIGN PATENT DOCUMENTS

39-12778  7/1964  Japan ....................... 428/671

*Primary Examiner*—L. Dewayne Rutledge
*Assistant Examiner*—W. G. Saba
*Attorney, Agent, or Firm*—Cushman, Darby & Cushman

[57] ABSTRACT

Silver alloy wire for the production of jewelry, especially jewelry chains is made of a solder containing nucleus and a jacket of silver or silver alloy wherein the solder containing nucleus has a core of silver or silver alloy surrounded by a layer of brass.

12 Claims, 4 Drawing Figures

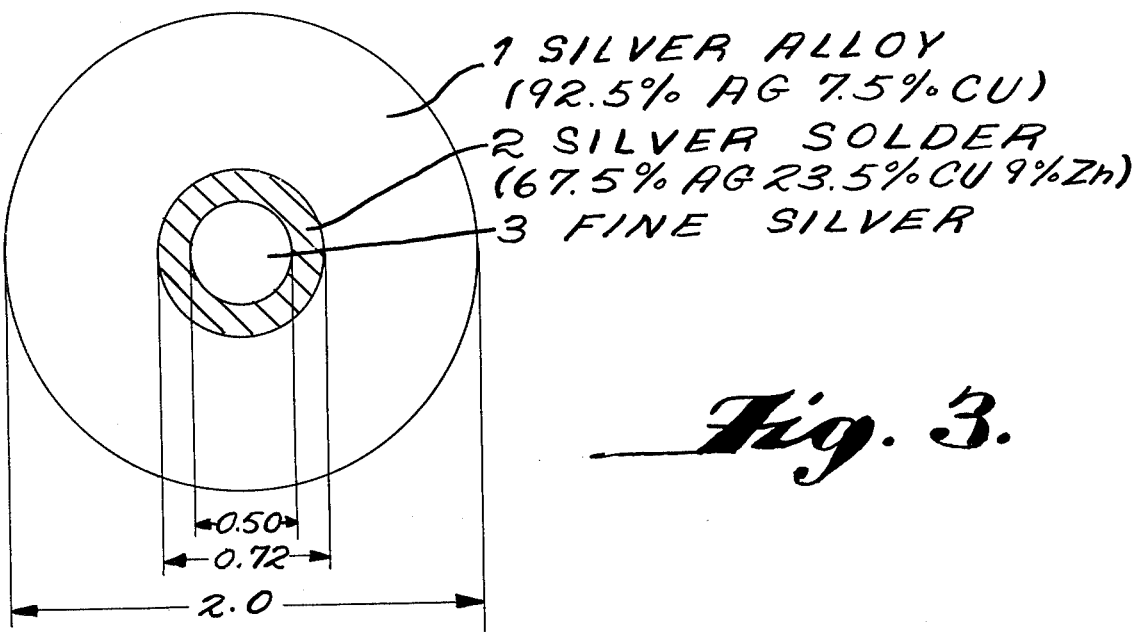
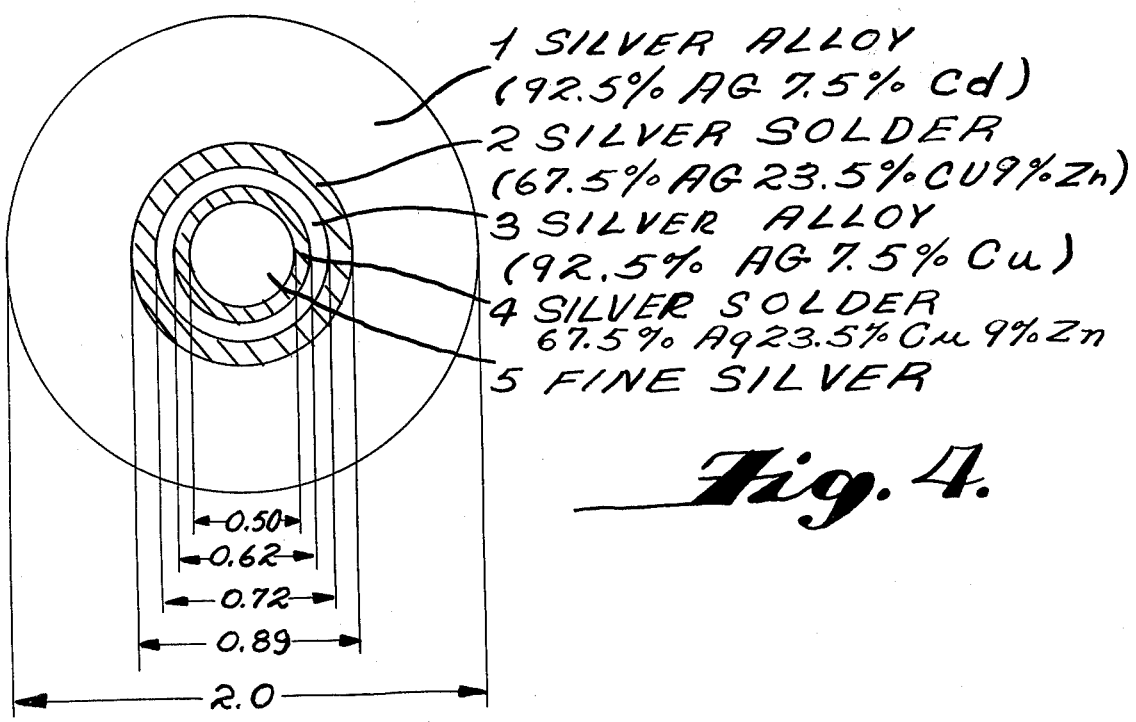

SILVER ALLOY WIRE FOR JEWELRY CHAINS

BACKGROUND OF THE INVENTION

The invention is directed to silver alloy wires for jewelry, especially for jewelry chains which consists of a solder containing nucleus and a jacket of silver or a silver alloy.

So-called silver-solder nucleus wires are preferably used for the production of jewelry chains. These silver-solder nucleus wires consist of fine silver or of silver alloys which contain a nucleus of a lower melting silver hard alloy. The silver fineness content of the wires for the most part is 835 or 925 per thousand. Chains are prepared from these wires on special machines, which then are treated with flux materials and talcum powder. Subsequently they are heated in continuous heating oven whereby in the link, i.e. the contact place of two wire ends of each chain member a small amount of solder must be melted in order that there is formed a solder joint of sufficient strength inside each chain member.

In place of solder nucleus wires there are also employed solid wires of silver alloys, likewise in a fineness content of 835 or 925 per thousand. The working of these wires to jewelry chains is substantially more expensive since a powdery solder must be applied in the narrow links in order that there can be formed a solder joint of sufficient strength between the wire ends of each chain member.

A greater portion of the jewelry chains are additionally shaped by rolls and are turningly worked with diamond tools (so called diamonding). It is important thereby that the silver fineness content of the chain not be changed in these additional operations.

With the previously known silver alloy nucleus wires it is a matter of wires which consist of a jacket of fine silver or silver weakly alloyed with copper or cadmium (maximally up to 5 weight %) and a nucleus of a low melting silver hard alloy with an average silver content of about 40 to 70%. The total fineness content of the solder nucleus wire of 835 to 925 is established by the variable silver portion of the alloy and the non-noble alloys of the fine silver jacket.

There are also known silver solder nucleus wires which consist of a wire shaped nucleus of copper which is surrounded by a thin tubular shaped silver hard alloy on which is located a substantially thicker silver jacket.

Since the silver hard alloys for the most part are brittle and therefore very difficult to mold there occurs in the production of such silver-alloy nucleus wires great difficulties. If the brittle alloy nucleus or the alloy layer splits in the preparation of the wire there are formed alloy nucleus wires with faulty places not ascertainable from the exterior which do not contain solder and therefore lead to large amounts of scrap in the preparation of the jewelry chains.

Besides if these known solder nucleus wires are worked by so-called diamondization, i.e. chipping away of the fine silver jacket then the original fineness content of the wire changes to lower values in the jewelry chains. Therewith the value fixed in applying the chasing can no longer be maintained in the finished chains.

A further disadvantage of the known solder nucleus wires with hard, brittle wire nuclei is to be seen in the shaping of round wires and profile wires, for example, rectangular or semicircular cross section. The hard nucleus of silver solder scarcely changes its round shape with the profile rolls, only the ductile silver presses off laterally. As a result there are formed profile wires with extremely thin wall strength in spots which lead to solder breakthroughs with the solder of the jewelry chains, i.e. solder leavenings, whereby the chain is unusable.

A further disadvantage of the previously known silver solder nucleus wires is that because of the relatively large portion of solder, which is caused by the establishment of the fineness content, the solder flux is very difficult to influence at solders of the chains.

Therefore it was the problem of the present invention to create silver alloy wires for jewelry, especially for jewelry chains consisting of a solder containing nucleus and a silver or silver alloy jacket, which do not have the above described disadvantages, particularly show no solder outbreaks in the working and also are capable of being chased in the diamondization. Besides they should be easily producible and processible.

SUMMARY OF THE INVENTION

This problem was solved by the invention by providing a core of silver or silver alloy for the solder containing nucleus which is surrounded by a layer of brass. Advantageously the silver core is alternately surrounded by several layers of brass and silver or silver alloys.

The silver solder nucleus wires of the invention differ from the known above all in that in place of very brittle silver solder there is employed ductile brass with zinc contents of preferably about 15 to 40 weight %. There has especially proven good a brass containing about 37% zinc, balance copper.

Through the use of ductile brass layers, i.e., copper-zinc alloy layer there do not appear any working difficulties in the production of the silver-solder nucleus wires according to the invention wherein one starts from a silver nucleus which is surrounded by one or more brass tubes and one or more silver or silver alloy tubes.

Through the necessary intermediate annealing in the production of the wire and in the soldering process the jewelry chains form a solderable layer of silver solder by the diffusion of silver, copper and zinc. The individual starting components of this solder nucleus wire such as fine silver nucleus, brass tube and outer tube of silver or silver alloys, remain ductile. The thickness and also the composition of the solderable diffusion layer is controlled by a regulated heat treatment.

The desired fineness content of this wire is fixed by the nucleus of fine silver, the non-noble brass intermediate jacket and the outer jacket of a silver alloy, e.g. of Ag-Cu or Ag-Cd or Ag-Cu-Cd. Such alloys are for example silver with 7,5 weight % copper or silver with 8 weight % copper and 8 weight% cadmium.

The silver solder nucleus wires of the invention can be constructed with either a single intermediate layer or a plurality of intermediate layers of brass according to the intended use these brass solder layer can be arranged preponderantly in the inner or middle region of the wire cross section. Basically the nucleus consists of fine silver wherein the fine silver portion and the non-noble brass portion correspond to the desired fineness content of the solder nucleus wire. The individual layers of the silver alloy according to the desired fineness content are alloyed either with copper or cadmium. Through this means both the nucleus and jacket contain the same silver content, wherefore the wires also correspond according to the diamondization of the chasing applied.

The thickness of the brass insert or of the other inserts is held so small that in the chain solders a sufficient adherence is formed in the link, but no excess solder can leave the link.

The cross section ratio and the alloy content of the individual brass and silver layers is advantageously so selected that both the nucleus and the jacket have about the same silver content.

Through the building up from ductile, individual components such as fine silver, brass or silver alloys these wires can be prepared without the otherwise customary solder outlines with great certainty. In the rolling of profile the solderable zones adjusts itself through the very soft nucleus of fine silver and the ductile brass layers. By this means wall thickness changes can be avoided. The solder nucleus wire of the invention in this way shows, independent of the profile a uniform and sufficient wall strength, above all then, if the solder zone is arranged extended into the center of the wire.

Through the distribution of the relatively large solder surface area with previously known solder nucleus wires in one or more ring shaped zones, an excessive amount of solder in the links of the chains are avoided.

Since the silver solder necessary for the soldering is first formed by a diffusion process the portion of solder can be varied by the heat treatment employed. With this mode or operation the certainty of manufacture in the soldering of the chain can be improved considerably by avoiding excess solder.

A further manufacturing advantage is the use of conventional brass tubes in place of insertions of silver solder in the form of bars, tubes or strips of sheet bent into tubes which are very expensive to produce.

The great advantage of the new solder nucleus wires is that they can be diamonded (i.e. milled away) to any desired depth without shifting the fineness content to low values. Due to the nucleus of fine silver the fineness content of diamonded chains is increased a trifling amount. Diamonded jewelry chains from these wires therefore fulfill all requirements which are retained in the chasing.

BRIEF DESCRIPTION OF THE DRAWINGS

FIG. 3 is a schematic illustration of one form of the silver-solder wire of the invention showing the cross-sectional ratio in millimeters and composition of the individual layers of the chain.

As shown in FIG. 3 the diameter through the silver alloy layer 1 is 2.0 mm, the diameter through the silver solder layer 2 is 0.72 mm and the diameter of the fine silver layer 3 is 0.50 mm.

FIG. 4 is a schematic illustration of another form of the silver-solder wire of the invention showing the cross-sectional ratio in millimeters and composition of the individual layers of the chain.

As shown in FIG. 4 the diameter through the silver alloy layer 1 is 2.0 mm, the diameter through the silver solder layer 2 is 0.89 mm, the diameter through the silver alloy layer 3 is 0.72 mm, the diameter through the silver solder layer 4 is 0.62 mm and the diameter of the fine silver layer 5 is 0.50 mm.

Unless otherwise indicated all parts and percentages are by weights.

The jewelry chains can consist essentially of or consist of the materials set forth.

DESCRIPTION OF THE PREFERRED EMBODIMENTS

Figure 1:
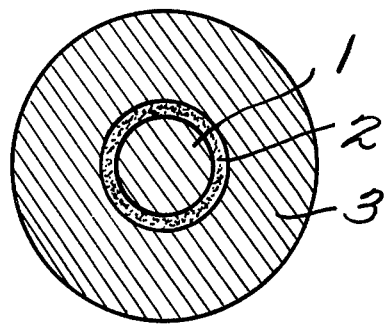
FIG. 1 is a schematic illustration of one form of the silver-solder chain of the invention.

Referring more specifically to FIG. 1 the silver-solder nucleus wire consists of a silver core 1 which is surrounded by a brass layer 2 and an outer silver jacket 3.

Figure 2:
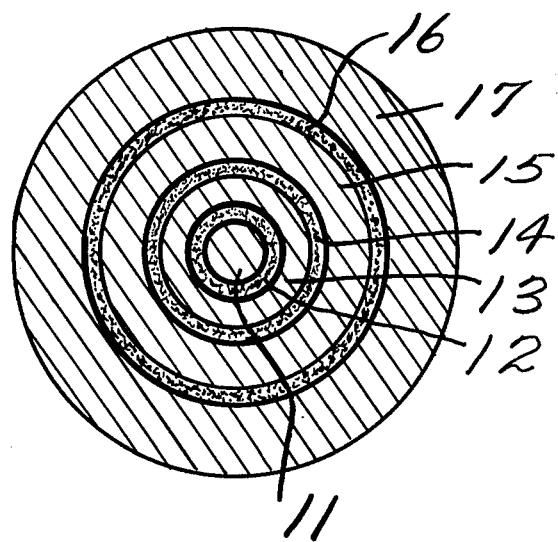
FIG. 2 is a schematic illustration of another form of silver-solder chain according to the invention.

As shown in FIG. 2 the wire consists of a silver core 11 which is surrounded alternately by several brass layers 12, 14 and 16 and silver layers 13 and 15 and an outer silver jacket 17.

As shown in FIG. 3 the silver alloy 1 consists of 92.5% silver, and 7.5% copper, the silver solder 2 consists of 67.5% silver, 23.5% copper and 9% zinc and inner layer 3 is of fine silver.

As shown in FIG. 4 the silver alloy 1 consists of 92.5% silver, and 7.5% copper, the silver solder 2 consists of 67.5% silver, 23.5% copper and 9% zinc, the silver alloy 3 consists of 92.5% silver and 7.5% copper and 2% zinc, the silver solder 4 consists of 67.5% silver, 23.5% copper and 9% zinc and inner layer 5 is of fine silver.

It has also been found advantageous to select the cross-section ratio and composition of the individual layers of the solder containing nucleus so that the nucleus and jacket contain about the same amount of silver.

There is hereby incorporated by reference the entire disclosure of the German priority application P 28 26 812.4.

What is claimed is:

1. In a silver alloy wire suitable for the production of jewelry, especially jewelry chains consisting essentially of a solder containing nucleus and a jacket of silver of a silver alloy the improvement comprising said nucleus having a core of silver or silver alloy surrounded by an adjacent layer of brass.

2. A wire according to claim 1 wherein the nucleus has a degree of fineness of 835 to 925.

3. A wire according to claim 1 wherein the brass contains 15–40% zinc, balance essentially copper.

4. A wire according to claim 3 wherein the brass contains 37% zinc, balance copper.

5. A wire according to claim 4 wherein the core is silver and the jacket is silver.

6. A wire according to claim 1 wherein the core is surrounded by a plurality of alternating layers of (1) brass and (2) silver or silver alloy, the first layer being a brass layer and the final jacket layer being silver or silver alloy.

7. A wire according to claim 6 wherein the brass contains 15–40% zinc, the balance consisting essentially of copper.

8. A wire according to claim 7 wherein the brass contains 37% zinc, balance copper.

9. A wire according to claim 1 wherein the silver alloy is a silver-copper, a silver-cadmium or a silver-copper-cadmium alloy.

10. A wire according to claim 9 wherein the alloy is a silver-copper alloy containing not over 5% copper or a silver cadmium alloy containing not over 5% cadmium.

11. A wire according to claim 6 wherein the cross-section ratio and composition of the individual layers of the solder containing nucleus are such that the nucleus and jacket contain about the same amount of silver.

12. A wire according to claim 1 wherein the cross-section ratio and composition of the individual layers of the solder containing nucleus are such that the nucleus and jacket contain about the same amount of silver.

* * * * *